April 5, 1960   P. BÄRWINKEL   2,931,660
QUICK CHANGE DRILL CHUCK
Filed May 17, 1956
FIG. 1
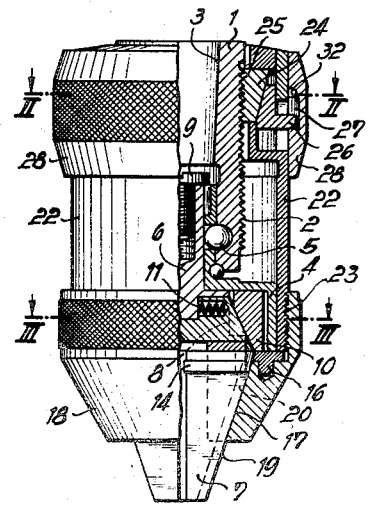
FIG. 5
FIG. 6
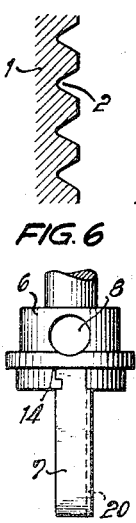
FIG. 7
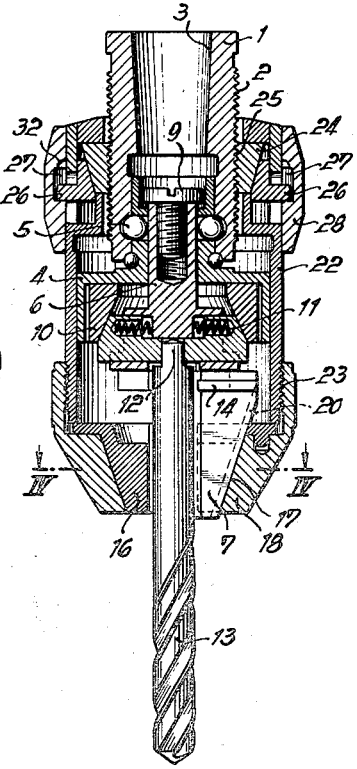
FIG. 2
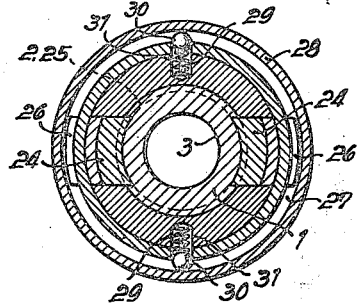
FIG. 3
FIG. 4
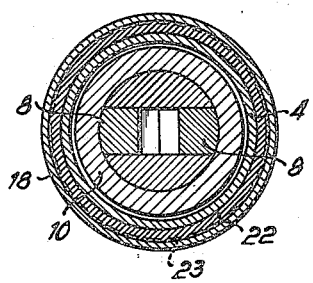

United States Patent Office 2,931,660
Patented Apr. 5, 1960

2,931,660

QUICK CHANGE DRILL CHUCK

Paul Bärwinkel, Dusseldorf-Unterrath, Germany

Application May 17, 1956, Serial No. 585,510

7 Claims. (Cl. 279—48)

The invention relates to drill chucks for rotary tools and has for an object the provision of a chuck which allows tools to be clamped and released quickly even when the diameters of the tool shanks are different. According to the invention, tool changes can be carried out while the associated machine is running.

With known clamping chucks it is always necessary both for clamping and releasing a tool, to tighten or loosen a threaded bushing. This takes time and sometimes requires the exertion of a relatively great force.

According to the invention, radially movable and threaded wedge members are arranged in a clamping sleeve such that a threaded engagement between the wedge members and associated chuck body can be effected or released by axially shifting the clamping sleeve and the associated tool thereby clamped or liberated. As a result, no threading operation with the normally required exertion of force is necessary for releasing or grasping the tool, since it is liberated or fastened almost instantaneously by engaging or disengaging the coupling formed by the intermeshing threads without exerting any force.

For shifting the wedge members, angular wedges mounted in the clamping sleeve are preferably provided and these are actuated by an operating or shift ring axially slidable on the clamping sleeve.

The invention is applicable to chucks with single and double grips which grip the tang and shank of the tool.

If the chuck is equipped for double gripping, that is the tools are gripped simultaneously on the shank and on the tang, an axial displacement of the chuck body with the locking arrangement of the wedge members disengaged effects, according to the invention, an independent radial movement of the clamping jaws for the shank and of the clamping bolts for the tang.

The arrangement may be such that the carrier for the clamping members engaging the tang of the tool is rotatable and axially shiftable in a guide member mounted in the chuck body together with a wedge ring surrounding the clamping members. The jaws gripping the tool shank can be mounted in guides on the carrier and slidable transversely of the axis of the chuck.

The possibility of disengaging the locking arrangement provided by the invention offers the advantage that a tool can be introduced into the chuck without danger and clamped in the above manner while the machine is running with the clamping elements at a standstill. The subsequent locking effects the transmission of the rotary motion of the drill spindle to the tool and the clamping force is almost proportional to the torque to be transmitted. The axial displaceability of the carrier provides the advantage that one is not confined to certain thicknesses for the tang in proportion to the external diameter of the shank to be clamped.

The wedge ring surrounding the clamping bolts preferably has radial play in the guide member in which the carrier is arranged. In this manner, inaccuracies in the position of the tang relative to the axis of the tool cannot have any detrimental effect on the centering of the tool because the wedge ring and with it the clamping members can adjust themselves automatically to the position of the tang.

An embodiment of the invention is illustrated by way of example in the accompanying drawing in which:

Fig. 1 illustrates a chuck, partly in elevation and partly in vertical section, the jaws being set for the smallest tool diameter;

Fig. 2 is a cross-section through a part carrying an operating ring, taken along section line II of Fig. 1;

Fig. 3 is a cross-section through the part of the chuck effecting the clamping of the tang of the tool, taken along line III of Fig. 1;

Fig. 4 is a cross-section through the chuck part which clamps the tool shank, taken along line IV of Fig. 7;

Fig. 5 shows the thread employed by the invention on an enlarged scale;

Fig. 6 shows the suspension of a clamping jaw in a jaw carrier, and

Fig. 7 is a longitudinal section through the chuck with a drill clamped therein.

The chuck consists of a chuck body 1 provided with an external V-thread 2 (Fig. 5) with a flattened ridge. Body 1 has a conical bore 3. This latter serves for receiving the mandrel of the associated drilling machine (not shown). A guide member 4 for a chuck sleeve 22 is rotatably mounted in the chuck body 1 and is secured in position by means of balls 5. A carrier 6 (Figs. 1 and 6) for clamping jaws 7 and clamping bolts 8 is mounted in the guide member 4 so as to be rotatable as well as axially slidable. Screws 8 serve for limiting the displacement stroke of the carrier 6. A wedge ring 10 is mounted in a corresponding recess in the guide member 4. This wedge ring has circumferential play in the recess and surrounds the clamping bolts 8 which are suitably tapered at their ends remote from the tool to bear against the hollow conical surface of the wedge ring. Bolts 8 are loaded by springs 11. These latter tend to press the clamping bolts 8 apart. The clamping bolts 8 serve for engaging the tang 12 of the drill.

The clamping jaws 7, which are intended for gripping the drill shank 13, are suspended in T-shaped grooves 14 in the jaw body 6 and slidable in these grooves in a direction transverse to the axis of the chuck. They are guided in grooves 15 in a jaw guide 16 which is mounted in a conical bore 17 in a cap 18 so that the clamping jaws 7 bear against guide 16 with their rounded rear surfaces 19 and are as well axially shiftable. The guide bars 20 of the clamping jaws 7 are simply guided in recesses 21 in the jaw guide 16 and serve for moving the clamping jaws away from the tool when the chuck is being opened. The cap 18 and the chuck casing or sleeve 22 are interconnected by a screw thread 23. Wedge members 24 are arranged in the sleeve 22 such that they are transversely movable relative to the axis of the chuck. Wedge members 24 have on the side facing the chuck body 1 a thread 25 corresponding to the thread 2 of the chuck body.

Sliding wedges 26 are arranged in the casing sleeve 22 in positions generally opposite to that of the wedge members 24. The wedge surfaces of these sliding wedges 26 bear against the wedge members 24 and each wedge 26 is provided with an arm which projects into a recess 27 in the operating ring 28. This latter is axially shiftable on the casing sleeve 22. If the operating ring 28 is shifted in downward direction, the sliding wedges 26 are likewise moved downwards, so that the wedge members 24 disengage from the thread 2 of the chuck body 1 which can then be displaced freely in an axial direction. The wedge arrangement or angle between the wedge members 24 and the sliding wedges 26 is such that it is impossible for the wedge members 24 to force back the sliding wedges 26 as the clamping pressure tightens. In other words, the arrangement is self-locking.

The chuck operates in the following manner:

If it is desired to clamp a drill in the open chuck, which can be effected while the machine is running, the drill 13 is slipped into the chuck with one hand so that the tang 12 is positioned between the clamping bolts 8. The clamping sleeve 22 is then held firmly with the other hand and pushed in an upward direction. Body 1 thus moves downwardly relative to sleeve 22 and the cone 17 of the cap 18 thereby presses the clamping jaws 7 against the shank of the drill while the clamping bolts 8 are pressed by the wedge ring 10 against the tang 12. The clamping elements now bear firmly against the tool and hold it tightly, so that the hand holding the tool can be removed. The operating ring 28 is now pushed upwards, which can be effected, for example, by the thumb of the hand gripping the clamping sleeve 22. When the drill is then brought into engagement with the workpiece, the body 1 is rotated relative to sleeve 22 and the clamping elements are automatically pressed tightly against the drill through the operation of the chuck thread and the wedge members.

To release the drill, the operating ring 28 is pushed axially downwards. The wedge members 24 are moved out of the position in which they are threadably engaged because of the radially outward displacement of the sliding wedges 26 with the result that the clamping pressure of the chuck sleeve 22 is relieved and the clamping elements 7 and 8 release the drill.

More specifically, the V-threads 2 and 25 when in engagement enable rotation of body 1 to exert an axial thrust against jaws 7 whereby the latter are firmly held against cap 18. When wedges 24 and 26 are disengaged, however, this axial thrust is not transmitted so that jaws 7 loosen and the tool can be removed.

The widening of the annular groove 27 in the operating ring 28 relatively to the thickness of the arms of the sliding wedges 26 enables a slight blow exerted on the sliding wedges during the axial displacement of the operating ring to effect a disengagement of the clamping lock such that the chuck can be opened very easily even when the automatic self-locking of the chuck has attained its maximum clamping pressure due to the drilling operation.

When the tool is clamped, the operating ring 28 is secured in its uppermost position by means of balls 30 mounted in bores 31 in the chuck sleeve 22 and loaded by springs 29 and engaging in ball sockets 32 in the operating ring.

By means of this invention a drill chuck is produced which renders possible rapid, automatic clamping in single or double manner. The invention provides the following important advantages:

(1) Rapid, safe exchange of tools, the shanks of which can be of like or different thicknesses, while the machine is running and the clamping elements are at a standstill.

(2) Automatic tightening of the clamping elements on the tool as the drilling proceeds.

(3) Absolutely non-slip clamping of the tool simultaneously at two clamping points and consequently complete elimination of damage to the tools at the clamping points.

I claim:

1. A chuck comprising tool engaging means, a chuck body adjustable between different positions for rendering the tool engaging means effective, a threaded portion on the chuck body, first and second cooperating wedge members, a V-threaded portion on the first of the wedge members corresponding to the threaded portion on the chuck body, and control means operatively engaging said second wedge member for relatively positioning the wedge members so that the threaded portions of the first wedge member and chuck body are selectively engaged whereby, with the threaded portions engaged, the position of the chuck body is threadably adjustable and, with the threaded portions disengaged, said chuck body is freely adjustable for adjustment of the said tool engaging means.

2. A chuck as claimed in claim 1 wherein said wedge members define self-locking angles.

3. A chuck as claimed in claim 1 wherein said control means comprises an operating ring encircling said chuck body and wedge members, and an arm on the second of the wedge members, said ring defining a groove for engaging the arm.

4. A chuck as claimed in claim 1 wherein said control means comprises an operating ring encircling said chuck body and wedge members, and an arm on the second of the wedge members, said ring defining a groove for engaging the arm, said groove being wider than the thickness of the arm.

5. A chuck as claimed in claim 1 comprising a wedge ring and a guide coupled to said chuck body and accommodating said wedge ring with radial play and for movement with said chuck body, said tool engaging means being responsive to said wedge ring for engaging a tool.

6. A chuck as claimed in claim 5 comprising a sleeve rotatably positioned on said chuck body, a conical cap connected to said sleeve, a carrier coupled to said chuck body and a plurality of jaws suspended from said carrier and accommodated in the conical cap, said sleeve being adjustable for controlling said jaws.

7. A chuck as claimed in claim 6 wherein the cap and wedge ring have oppositely inclined contiguous surfaces.

References Cited in the file of this patent

UNITED STATES PATENTS

| | | |
|---|---|---|
| 1,606,972 | Nielson | Nov. 16, 1926 |
| 1,804,506 | Lindblad | May 12, 1931 |
| 1,935,645 | Lundin | Nov. 21, 1933 |
| 2,585,747 | Denzler | Feb. 12, 1952 |
| 2,809,845 | Emrick | Oct. 15, 1957 |

FOREIGN PATENTS

| | | |
|---|---|---|
| 417,144 | Germany | Aug. 19, 1924 |
| 147,281 | Switzerland | Oct. 12, 1954 |